US006849219B2

(12) United States Patent
Rollins

(10) Patent No.: US 6,849,219 B2
(45) Date of Patent: Feb. 1, 2005

(54) INJECTION MOULDING METHODS AND APPARATUS

(75) Inventor: David Rollins, High Wycombe (GB)

(73) Assignee: Swan Valley Designs Limited, Buckinghamshire (GB)

( * ) Notice: Subject to any disclaimer, the term of this patent is extended or adjusted under 35 U.S.C. 154(b) by 47 days.

(21) Appl. No.: 10/182,571

(22) PCT Filed: Jan. 31, 2001

(86) PCT No.: PCT/GB01/00382

§ 371 (c)(1),
(2), (4) Date: Nov. 5, 2002

(87) PCT Pub. No.: WO01/56772

PCT Pub. Date: Aug. 9, 2001

(65) Prior Publication Data

US 2003/0107156 A1 Jun. 12, 2003

(30) Foreign Application Priority Data

Jan. 31, 2000 (GB) .............................. 0002198

(51) Int. Cl.[7] .............................................. B29C 45/16
(52) U.S. Cl. ................. 264/255; 264/328.7; 264/328.8; 264/328.11; 425/127; 425/572; 425/576
(58) Field of Search ................................ 264/250, 255, 264/263, 297.3, 328.7, 328.8, 328.11; 425/127, 129.1, 572, 576

(56) References Cited

U.S. PATENT DOCUMENTS

| 3,807,920 | A | | 4/1974 | Aoki ........................... 425/134 |
| 5,221,538 | A | | 6/1993 | Gasami et al. .............. 425/127 |
| 6,299,816 | B1 | * | 10/2001 | Takemoto et al. .......... 264/250 |

FOREIGN PATENT DOCUMENTS

| DE | 19852553 | 2/1999 |
| FR | 1299327 | 12/1962 |

OTHER PUBLICATIONS

International Search Report for PCT/GB01/00382.

* cited by examiner

Primary Examiner—Jill L. Heitbrink
(74) Attorney, Agent, or Firm—Bromberg & Sunstein LLP

(57) ABSTRACT

An injection moulding apparatus for hollow parts comprises first and second co-operating dies, each die including a first male die core and a female die recess. One of the dies is rotatable about an axis. In a first angular position of the rotatable die, the male die core of the first die co-operates with the female die recess of the second die and the male die core of the second die co-operates with the female die recess of the first die, to define first and second moulds in which half-components may be formed. In a second angular position of the rotatable die, the respective female dies recesses of the first and second dies co-operate to form a third mould in which the half-components may be joined. The apparatus makes use of a single injector differentially controlled for each stage.

35 Claims, 9 Drawing Sheets

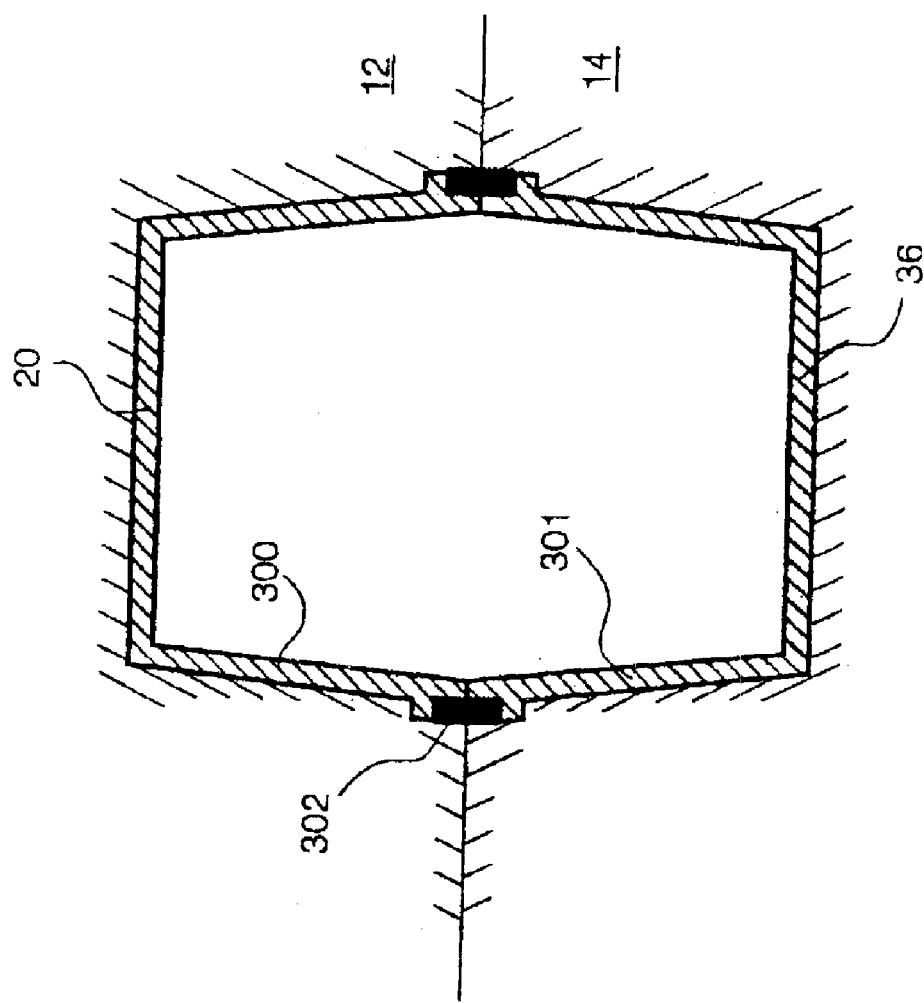

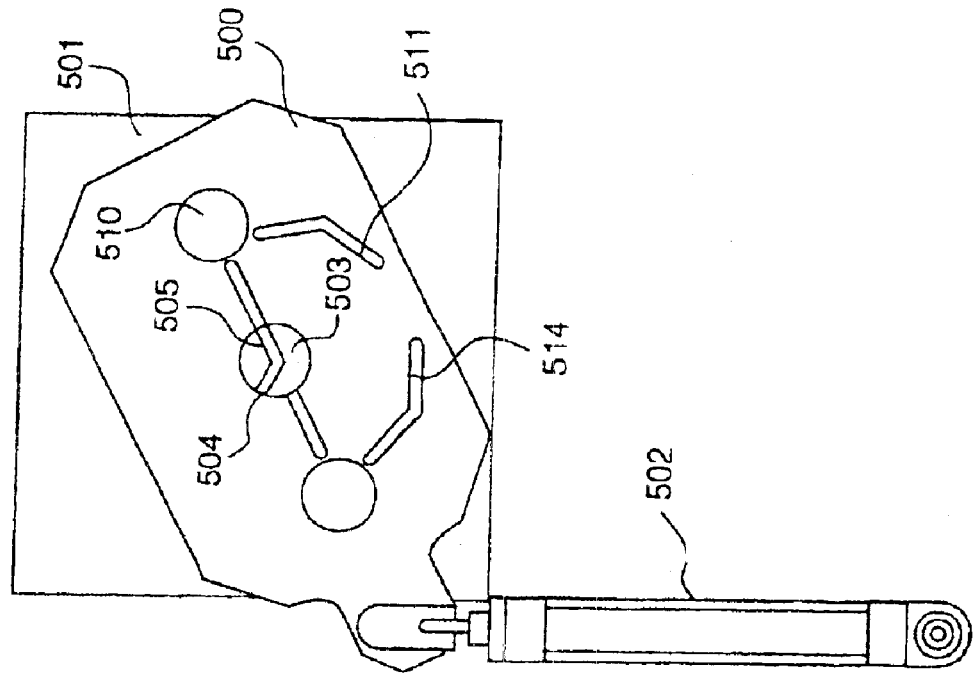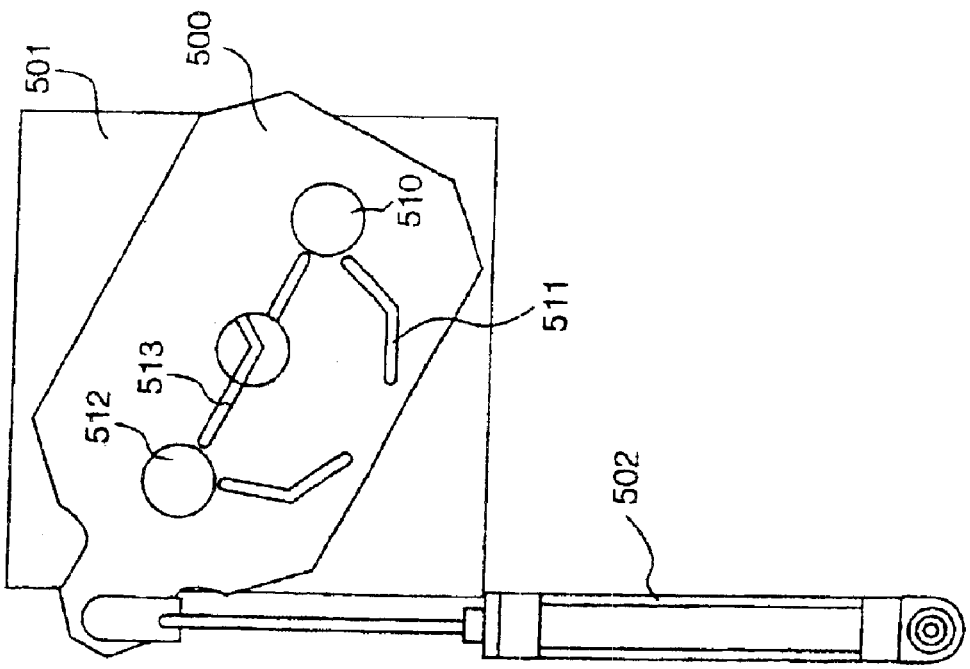

INJECTION MOULDING METHODS AND APPARATUS

The present invention relates to an apparatus and method for injection moulding and in particular to an apparatus and method for forming hollow elements such as air filters and fuel tanks for use in vehicles.

A prior art method for producing such hollow elements is know as the die slide moulding process. In this process, the hollow element is formed in two parts which are moulded separately at spaced locations. The dies are then moved apart and shifted laterally so as to bring the two parts into alignment with one another. Originally, the parts would be joined to form the hollow element by hot plate welding or vibration welding. More recently bimaterial moulding has been used, with a second material injected around about the join of the two parts, the second material connecting and joining the parts on setting.

The disadvantage of bimaterial moulding is that it requires two separate injection devices for injecting the two types of material, one material being injected into the moulds to form the parts by a first injection device and a second material being injected to join the two parts together by a second injection device. Likewise, two networks of injection channels are required and at least two hydraulic cylinders are required to shift the dies and to re-align them correctly. This results in an expensive and complex process which is only suitable for high volume production.

U.S. Pat. No. 5,221,538 describes an injection moulding machine for making hollow plastic products comprising two co-operating dies to form moulds for the plastic products. A first die is rotatable about a central axis and the second die is fixed with respect to rotation about the axis. One of the dies is moveable along the axis so that the dies can be brought together and separated. Each die consists of one male die core and two female die cavities located radially equidistantly from the centre axis and at an equal angle (120°) about the centre axis. The rotatable die can adopt two positions, in each of which a male die core from the first die co-operates with a female die recess from the second die and a male die core from the second die co-operates with a female die recess from the first die, allowing two hollow plastic half-products to be moulded. At the same time, the remaining female dies recesses of the respective first and second dies coincide, each containing a previously moulded half-product. The half-products are joined to form the final product whilst simultaneously two further half-products are moulded.

The apparatus described in U.S. Pat. No. 5,221,538 has certain disadvantages. Most signficantly, the apparatus of U.S. Pat. No. 5,221,538 is only suitable for moulding half-products which are similar since when the two dies are brought together each male die core must be accommodated in a corresponding female die recess. Thus, the height of the male die core at any given point must always be less than the depth of each female die recess at the corresponding point. In practice, the two half-products being moulded must be symmetrical.

A further problem in the apparatus of U.S. Pat. No. 5,221,538 derives from the movement of the rotatable die about a central axis. This makes more complex the attachment of features such as water cooling circuits and hydraulic circuits (if required) since the necessary piping must extend through the machine itself. Otherwise, the pipes may be connected at a periphery but would have to be flexible to move with the tool, so that the pipes undergo stress and strain and thus increased risk of failure.

Another potential problem with the apparatus of U.S. Pat. No. 5,221,538 derives from the fact that two new half-products are moulded simultaneously with the joining of two previously formed half-products. This requires a compromise with respect to the process control and parameters (e.g injection pressure and volume) for these steps, where in fact the requirements may not be the same.

The present invention provides apparatus for producing moulded articles, comprising: first and second dies, movable towards and away from one another parallel to an axis; the first and second dies each having at least one female die cavity and at least one male die core; means to reciprocally rotate the second die between at least first and second angular positions about the axis; and a single injection device communicating with first and second runner drops defined in the first die; wherein, in the first angular position, the female die cavity in the first die receives the male die core of the second die to create a first mould, the female die cavity in the second die receives the male die core of the first die to create a second mould, and the first and second moulds are in communication with the first and second runner drops respectively to receive molten material from the injection device to create two moulded parts; and, in the second angular position, the female die cavities of the first and second dies are aligned with one another to create a third mould which communicates with the first runner drop to receive molten material from the injection device which surrounds and joins the moulded parts together to produce a whole moulded material.

Preferably, the second die comprises a backing member and a body pivotally attached thereto for rotation about the axis relative to the backing member and the first die, the body having the at least one female die portion and the at least one male die portion of the second die.

The body preferably further includes a first runner associated with the male die core and second and third runners associated with the female die cavity of the body; wherein, in the first angular position, the first runner connects the first mould to the first runner drop in the first die and the second runner connects the second mould to the second runner drop in the first die; and, in the second angular position, the third runner connects the third mould to the fist runner drop in the first die.

In the second angular position, the second runner drop in the first die is conveniently blanked off by a blanking portion of the second die.

The blanking portion of the second die preferably comprises a heated plate.

The first and second dies may each have means for receiving the male die core of the other die in the second angular position (at which the female die cavities are in alignment). Said means for receiving the male die core may comprise a recess in the respective die. Alternatively, the body attached to the second die may be so sized that in the second portion, the male die core of the first die is located beyond the marginal edge of the body. Similarly, the male die core of the second die may, in the second position be located beyond a marginal edge of the first die.

In a preferred embodiment, the-means to reciprocally rotate the body between the first and second angular positions comprises a piston pivotally secured to the body and a cylinder fixedly secured to the backing plate.

Typically, the second die is movable towards and away from the first die along the axis under the action of a plurality of cylinders and cooperating pistons.

The apparatus may further comprise a plurality of co-operating dowels and bores formed in the first and second dies to hold the dies in alignment in the first and second angular positions.

Preferably, in the first angular position, the injection device is operable to inject a first quantity of molten material sufficient to fill the first and second moulds and, in the second angular position, the injection device is operable to inject a second, smaller quantity of molten material sufficient to join the moulded parts together.

The injection device may comprise a screw driven piston and cylinder.

The apparatus may further comprise means to inject material or add a farther component between or into one or both of the moulded parts before joining the parts together to form a whole article.

The present injection also provides a method of producing a moulded article using the apparatus described above comprising the steps of: with the first and second dies spaced from one another, rotating the second die to a first angular position; contacting the first and second dies whereby the female die cavity of the first die receives the male die core of the second die and the female die cavity of the second die receives the male die core of the first die to form first and second moulds respectively; injecting molten material from the injection device through the first and second runner drops into the first and second moulds to form two moulded parts; separating the fist and second dies rotating the second die to the second angular position; contacting the first and second dies whereby the female die cavities, each containing a moulded part, are aligned with one another to form a third mould; injecting molten material through the first runner drop to join the moulded parts together to create a whole moulded article; and separating the first and second dies to allow removal of the whole moulded article.

The method may further comprise the step of injecting material or adding a further component between the two moulded parts before the step of injecting molten material to join the parts together to form a whole article.

The invention will now be described in detail, by way of example only, with reference to the accompanying drawings in which:

FIG. 7 is a schematic view showing a cross-section through two dies of apparatus of the invention brought together in a second stage of manufacture;

FIG. 8 shows apparatus of a second embodiment of the invention in a first operating condition;

FIG. 9 shows the apparatus of the second embodiment in a second operating condition.

Figure 1:
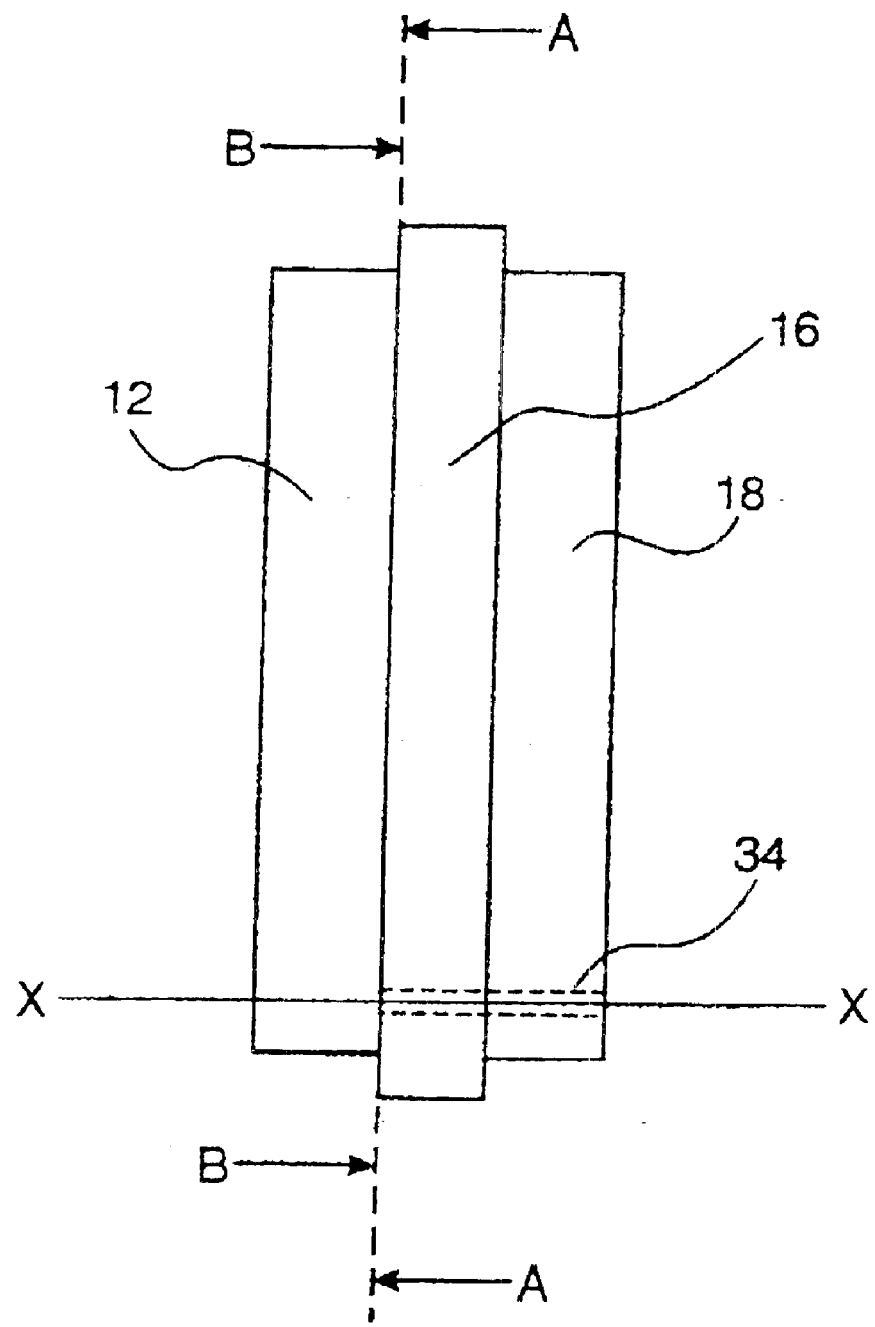
FIG. 1 is a simplified diagrammatic side view of the apparatus in accordance with one embodiment of the present invention.

Apparatus 10 for forming hollow elements by an injection moulding process in accordance with the first embodiment of the present invention is shown in side view and in simplified diagrammatic form in FIG. 1. The apparatus 10 comprises a first stationary die 12 and a second movable die 14. The movable die is itself made up of two parts, a pivoting body 16 and a backing plate 18. The movable die 14 as a whole is movable towards and away from the stationary die 12 in a direction parallel to an axis X—X under the action of a plurality of hydraulic cylinders 50. Additionally, the pivoting body 16 is rotatable about the axis X—X relative to the stationary die 12 and to the backing plate 18. Moulds are formed between the mating faces of the stationary die 12 and the pivoting body 16.

Figure 2:
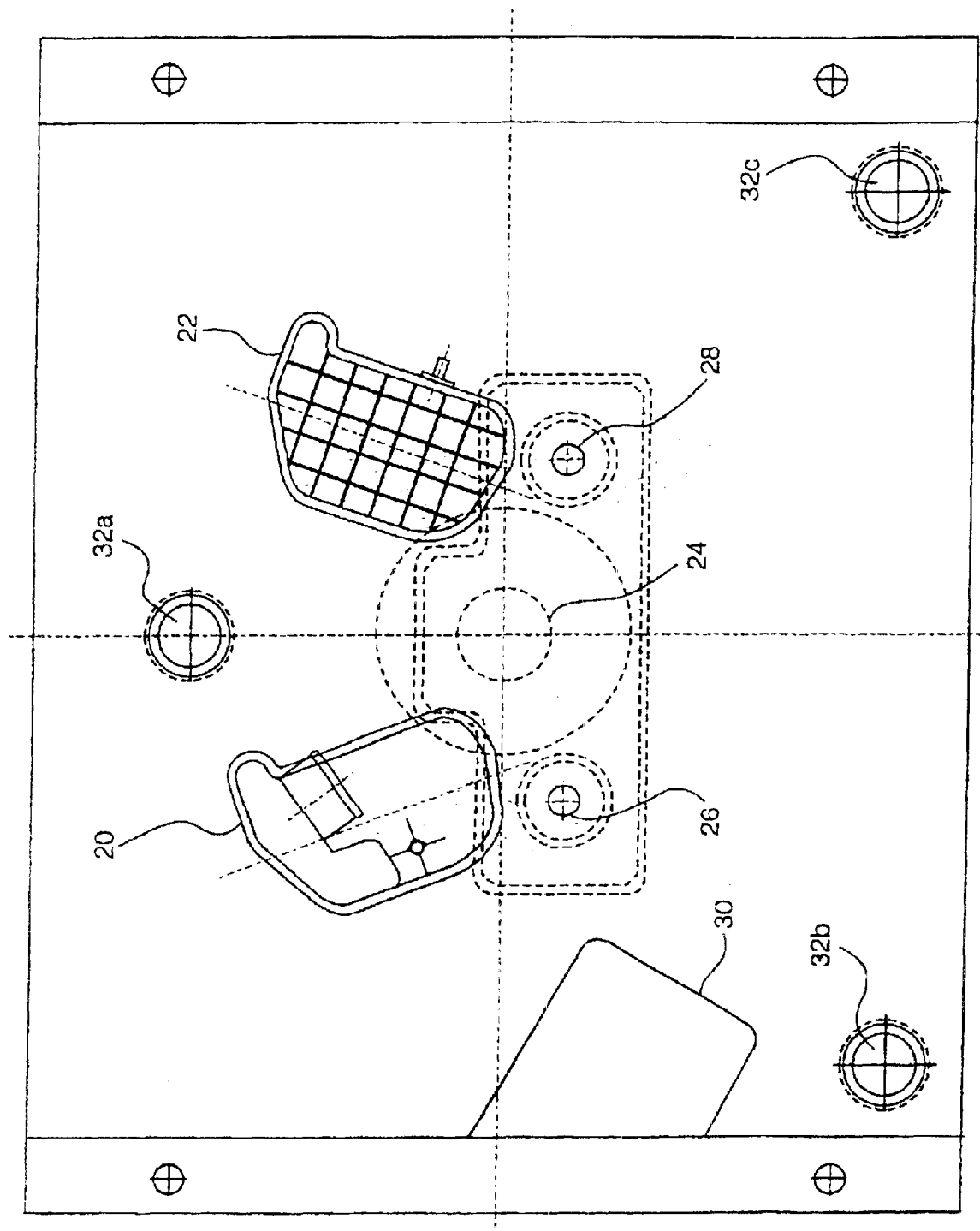
FIG. 2 is a plan view of one embodiment of a stationary die of the FIG. 1 apparatus, the plan view being shown in the direction of arrows A—A in FIG. 1.

As best seen in FIG. 2, the surface of the stationary die 12 which faces the movable die 14 in use, is formed with at least one female die cavity 20 and at least one male mould core 22.

An injection channel 24 connected to a single injection device (not shown) is formed in the stationary die 12 behind the plane of the drawing in FIG. 2. The injection channel splits into two runner drops to deliver and the open ends of the runner drops 26, 28 can be seen in FIG. 2.

The stationary die 12 is also provided with a recess 30 which receives a male die core from the movable die 14 during one stage of the production process, described farther below.

At least three dowels 32a, b, c are provided in the stationary die 12 in order to align it with the movable die 14 correctly in use, as described further below.

Figure 3:
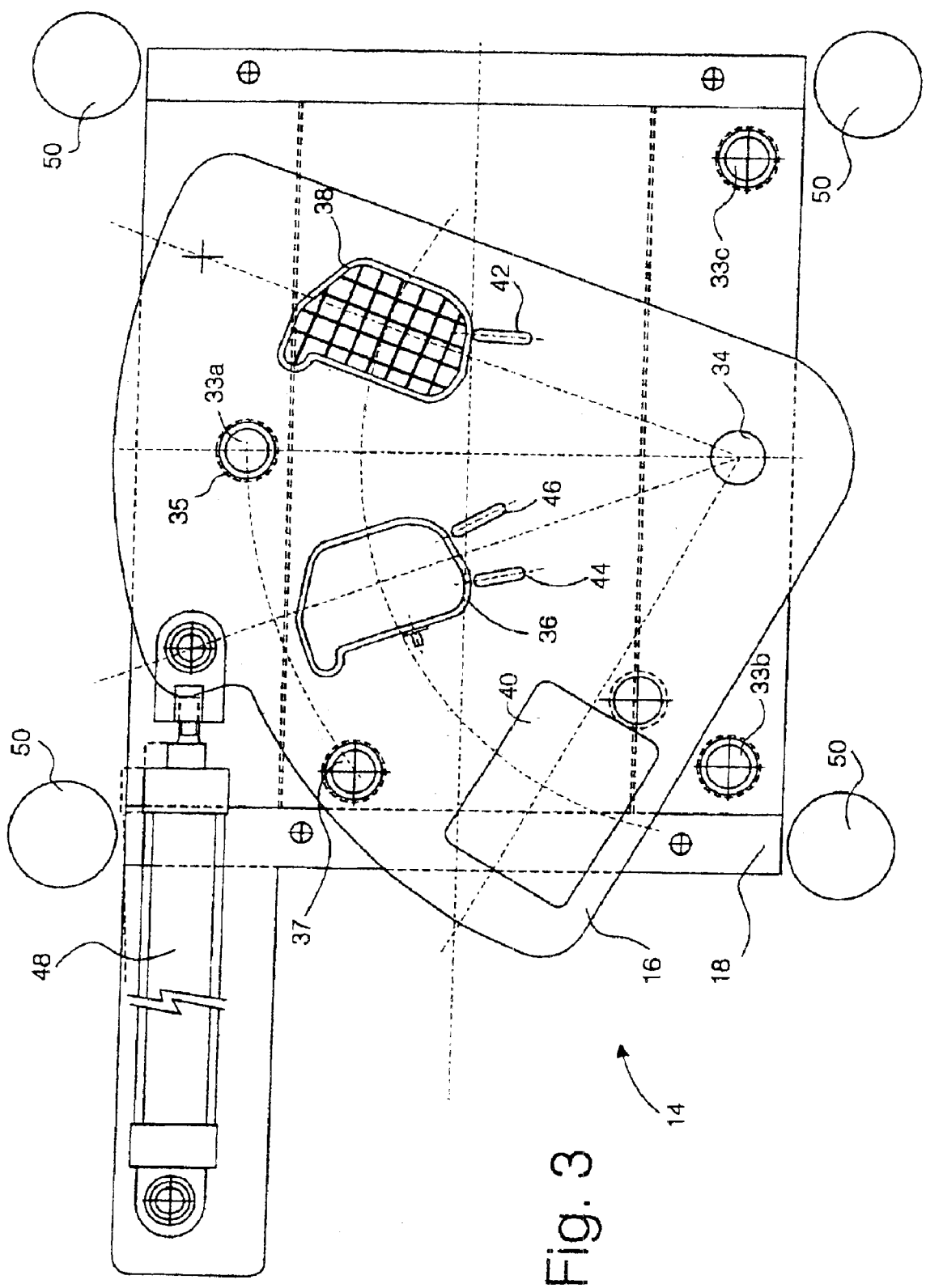
FIG. 3 is a plan view of one embodiment of a movable die of the FIG. 1 apparatus, the plan view being shown in the direction of the arrows B—B of FIG. 1.

The surface of the movable die 14 which faces the stationary die in use is best shown in FIG. 3. The movable die 14 comprises a backing plate 18 to which a pivoting body 16, in this example a substantially sector shaped element, is rotatably attached at pivot 34. The body 16 is reciprocatable between at least two angular positions under the action of a hydraulic cylinder 48, fixedly secured to the backing plate 18, and piston pivotally secured to the body 16.

The body 16 is formed with a female die cavity 36 and a male die core 38 which correspond to the male core and female cavity 22, 20 of the stationary die 14 respectively so as to form two moulds each for forming one part of a hollow element to be produced.

The body 16 is also formed with a recess 40 which in one stage of the process receives the male die core 22 of the stationary die 12.

As can best be seen in FIG. 3, the female die cavity 36, male die core 38 and, where present, recess 40 are arrange on an arc of a circle, the centre of which is of axis (pivot point) 34. The axis 34 is spaced apart from the centre of the body 16 and is ideally located towards one marginal edge of the body 16, such as towards a corner. The body 16 may hypothetically describe a body of resolution by complete rotation about the axis 34. Preferably, the body 16 comprises a segment of the body of revolution which occupies not more than half, and especially about one quarter of said hypothetical body of revolution. Expressed differently the pivot point 34 is, as shown in FIG. 3, advantageously essentially exterior to the mould tool itself and this facilitates the connection of pipes and conduits for water cooling and hydraulic circuits, if required.

A runner 42, only part of which is shown in the plane of the paper, is associated with the male die core 38 of the body 16.

Similarly, two runners 44, 46, only part of which are shown in the plane of the paper, are associated with the female die cavity 36 of the body 16.

The backing plate 18 includes three bores 33a,b,c for receiving the corresponding dowels 32a,b,c from the stationary die 12 to align the two dies in use. The body 16 also includes two through-holes 35, 37 through which the dowel rods may pass as discussed further below. Clearly, the dowel rods could be located in the movable die 14 and the bores for receiving the rods could be located in the stationary die 12, or a combination of the two could be used as an alternative configuration.

In order to form a hollow element using the apparatus shown in FIGS. 1–3, the hydraulic cylinders 50 are retracted so as to bring the stationary die 12 and the movable die 14 into contact with one another such that the female die cavity 20 in the stationery die 12 receives the male die core 38 from the body 16 to form a first mould. Similarly, the female die cavity 36 in the body 16 receives the male die core 22 from the stationary die 12 to form a second mould.

Figure 4:
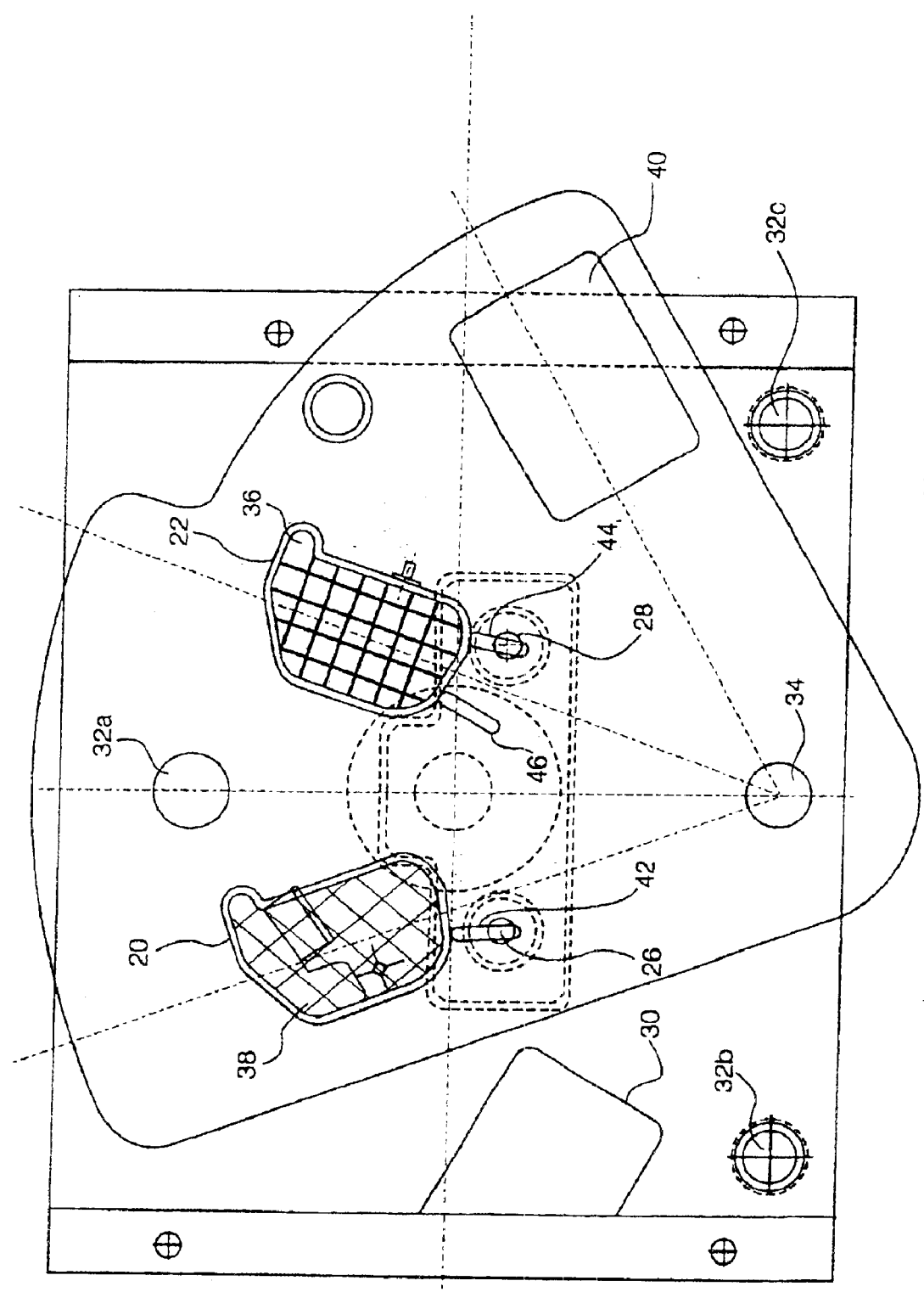
FIG. 4 is a plan view similar to FIG. 2 but showing part of the movable die superimposed and in a first position of the moulding process.

As seen in FIG. 4, in this first position the runner 42 in the body 16 is in communication with the runner drop 26 of the stationary die 12. Similarly, the runner 44 associated with the female mould cavity 36 of the body 16 communicates with the runner drop 28 in the stationary die 12.

In this first position, the stationary die 12 and the movable die 14 are kept in alignment with one another by the dowels 32*a,b,c* being received in the corresponding bores 33*a,b,c*. Dowel 32*a* passes through the hole 35 in the body 16 in order to extend into the bore 33*a* in the backing plate 18.

Figure 6:
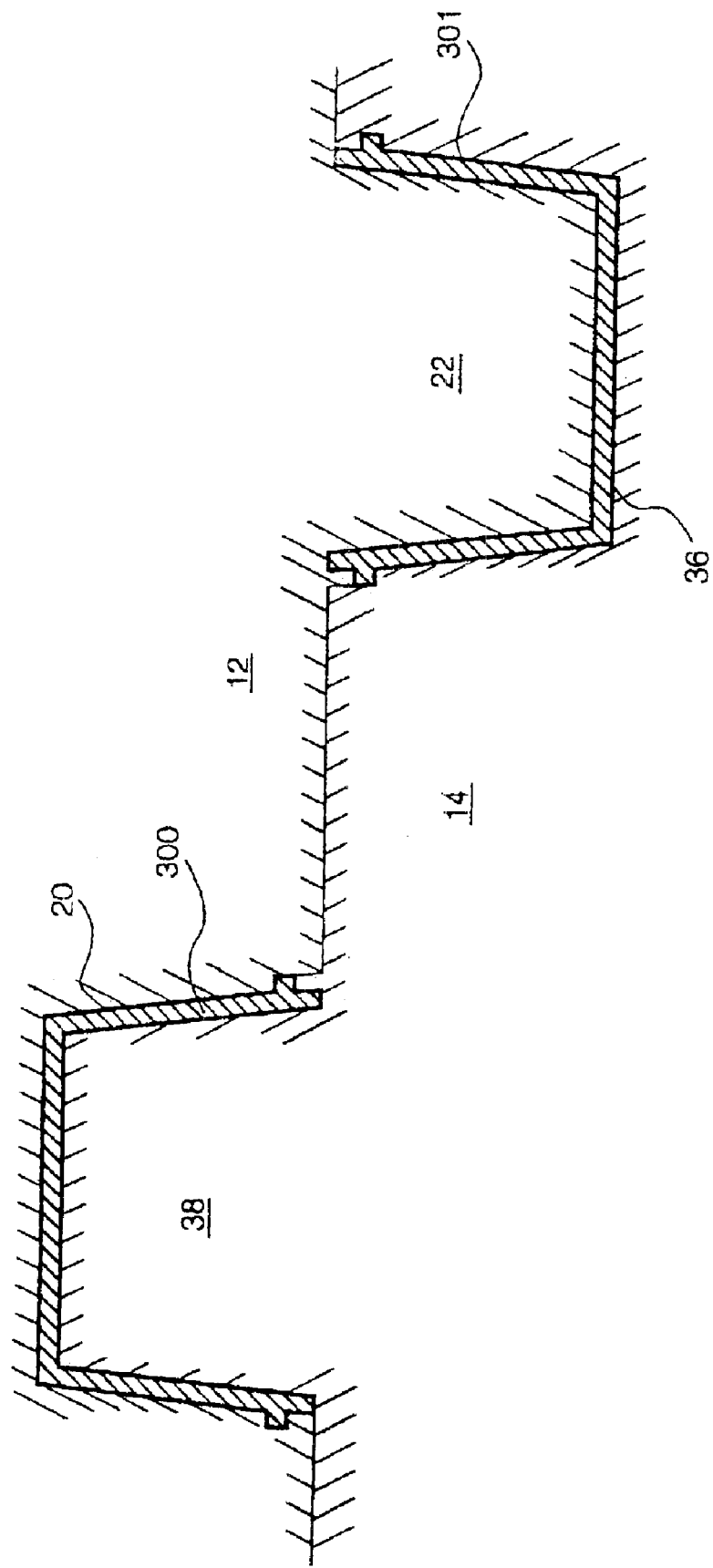
FIG. 6 is a schematic view showing a cross-section through two dies of apparatus of the invention brought together in a first stage of manufacture.

An injection device (now shown) such as a screw driven piston is connected to a common injection conduit 24 which in tun is connected to the runner drops 26 and 28. The piston is retracted to a first position in order to draw in sufficient molten material to fill the first and second moulds and form both halves of the hollow element. The piston is then extended in order to inject the molten material through the common conduit, runner drops 26 and 28 and the runners 42 and 44 and, thus, simultaneously into the first and second moulds in order to create the two parts. This is shown in FIG. 6, where two moulded parts 300, 301 can be seen, the moulded part 300 formed between core 38 of the movable die 14 and cavity 20 of the stationary die 12 and the moulded part 301 formed between core 22 of the stationary die 12 and cavity 36 of the movable die 14.

Figure 5:
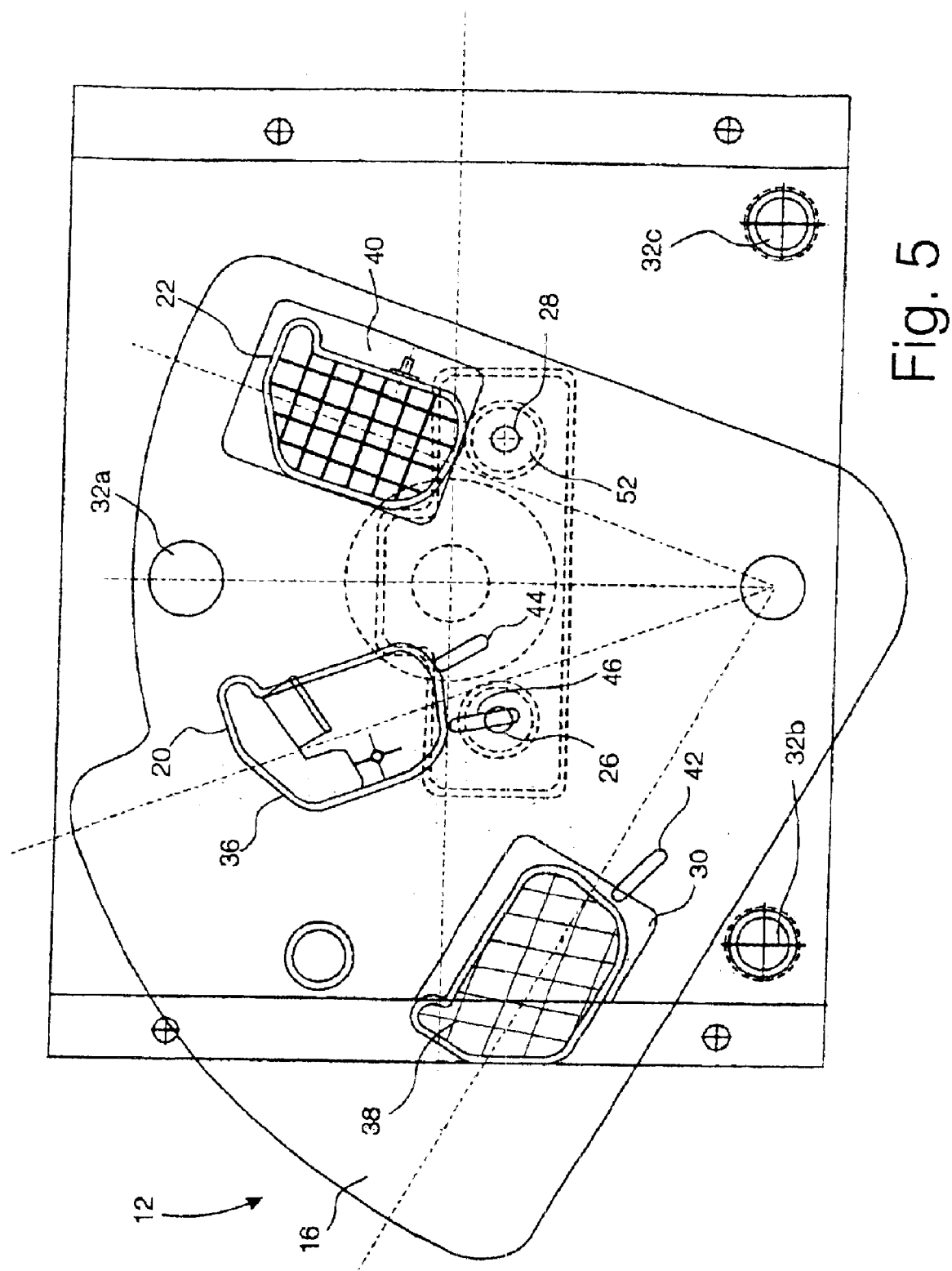
FIG. 5 is a view similar to FIG. 4 showing the movable die in a second position.

Once both parts 300, 301 have been formed, the hydraulic cylinders 50 are extended so as to separate the stationary die 12 and the movable die 14. The pivot hydraulic cylinder 48 is operated so as to rotate the body 16 about the pivot 34 into the second position shown in FIGS. 5 and 7 in which the two female die cavities 20, 36, each containing a moulded part, are aligned with one another. In this second position, the recess 30 in the stationary die 12 receives the male die core 38 of the body 16 and similarly the recess 40 in the body 16 receives the male die core 22 from the stationary die 12.

Because the respective male die cores 38, 22 are received in recesses 30, 40, the size and shape of the male die core is not constrained. In contrast to U.S. Pat. No. 5,221,538, the male die cores 38, 22 are not, in the second position, accommodated in a female die cavity and so the size and shape of the male die core can be freely selected. As a consequence, the apparatus of the invention is well suited to moulding half-components of differing sizes and shapes which are joined (in the second position) to form the final component. For example, one half-component may be a container of considerable depth and the other half-component may be a relatively shallow closure for the container. The apparatus of the invention may be used for moulding both large and small components, and because the apparatus does not itself impose any restriction on the shape of the components, the components may include more complex features such as bosses, brackets, legs, pipes, and the like.

The stationary die 12 and the movable die 14 are again kept in alignment in the second position by the dowel rods 32*a,b,c* being received in the corresponding bores 33*a,b,c*. In this case, the dowel rod 32*a* passes through hole 37 in the body 16 in order to extend into the bore 33*a* in the backing plate 18.

In this second position, the second runner channel 46 associated with the female die cavity 36 of the body 16 now communicates with the runner drop 26 in the stationary die 12. The other runner drop 28 is blanked off by a heated plate 52 in the body 16. The heated plate 52 keeps the molten material in runner drop 28 in a molten state and prevents a solid plug forming.

The injection piston (not shown) is now retracted to a second position in order to draw in a second, smaller amount of molten material. The piston is then extended so as to inject the molten material through the common conduit 24 and into the runner drop 26. The material is able to flow from the runner drop 26 into the second runner 46 and thus into the aligned female die cavities 20, 36. The moulded parts 300, 301 in the cavities 30, 36 abut along facing surfaces. Around the plane of abutment flows the molten material delivered through runner 46. When the molten material solidifies it forms a collar 302 which joins the two moulded parts 300, 301 together permanently. This is illustrated in FIG. 7 where there is shown a cross-section through a first moulded part 300 in the female cavity 20 of die 12 and a cross-section through a second moulded part 301 in the female cavity 36 of the die 14. The moulded part 300 has a section which abuts a section of the part 301. In the second operating position of the dies (illustrated in FIG. 5) molten material is injected to form the collar 302 around the moulded parts 300 and 301.

Since the amount of molten material required to form the collar 302 is significantly less than the amount required to form the two parts 300 and 301, the injection piston is retracted to a second position which does not draw in as much material into the cylinder as is drawn into the cylinder when the piston is retracted to the first position. The piston and cylinder device operates according to a computer program and will expel a first amount of material in one stroke and a reduced amount next and then the first amount in the following stroke and so on. Since the half-component forming stage is distinct from the stage of which the half-components are joined, these stages can be separately controlled. This is advantageous, for example, in moulding large components where high injection volumes and pressures may be required in the half-component forming stages, but much lower injection pressures and volumes are required in the half-component joining stage.

Once the two parts 300, 301 have been joined together, the four hydraulic cylinders 50 are extended so as to separate the stationary and movable dies 12,14 and allow removal of the complete hollow moulding. The pivot actuator 48 is operated to rotate the body 16 back into the first position so that the whole process may be repeated.

In one particularly preferred variation of the invention the flow of molten material into the respective moulds may be controlled by means of valve gates. The valve gates are located at the ends of runners at the point of entry into the respective mould and comprise a hydraulically acted pin which is moveable between a first position in which it closes the end of the runner and a second position in which the end of the runner is open. At any given stage in the process, the position of the valve gate may be chosen as appropriate. Thus, for the formation of the half-components 300, 301 in the first and second moulds, one runner (or one series of runners, each runner having a valve gate) may be directed to each of the respective first and second moulds, and the valve gates of each runner will be open. In the second stage where the half-components 300, 301 are joined, only one runner (or series of runners) is required, and the valve gates on the runner (or series of runners) not required may be closed. The use of valve gates allows for very precise control of the flow of molten material. For larger moulded articles, such as fuel tanks, the use of valve gates facilitates the use of more than one runner to a given mould, each runner having its own valve gate. For example, as many as six runners and valve gates may be provided for each mould. The use of valve gates also make the heated blanking plate 52 unnecessary since the valve gates control the flow of molten material.

In a variation (not shown) of the apparatus and method described above, an extra stage may be incorporated into the process between the first and second stages. That is, before the two moulded parts 300, 301 are brought together by alignment of the two female die cavities 20,38, one moulded part 300, 301 could be rotated to a filling position in which a material which the hollow element is to contain, (e.g a granular filtering material) is injected into the two moulded parts 300, 301. Alternatively, an additional component could be disposed within the moulded part 300, 301.

Subsequently, the second injection process is carried out as described above to provide the molten material to form collar 302 joining the two moulded parts 300, 301 together, to form a finished article containing the granular material.

The apparatus mentioned above can be operated in tandem with a matched second pair of dies, with the first pair and second pair operationally linked so that when one pair of dies is forming moulded parts 300, 301 the other pair of dies is forming a collar 302. This facilitates the use of one piston and cylinder device which delivers a fixed amount of molten material simultaneously to both pairs of dies in each stroke (because in each stroke the molten material is used to form both parts 300, 301 in one pair of dies and also a collar 302 in the other pair of dies).

In a second embodiment of the present invention, the apparatus is "doubled up" in order to double the rate of production. In this embodiment, the pivoting body 16 contains first and second pairs of female die cavities and male die cores, the pairs being arranged symmetrically about the pivot axis. Similarly, the stationary die contains first and second pairs of corresponding male die cores and female die cavities also arranged symmetrically about the pivot axis. In the first angular position of the pivoting body, the female die cavity and male die core of the first pair in the body are aligned with the corresponding male die core and female die cavity of the first pair in the stationary die to form first and second moulds in which the two moulded parts may be created. At the same time, the female die cavities of the second pair of both the body and the stationary die are aligned with one another to form a third mould in which two previously formed moulded parts may be joined together to form a whole moulded article.

When the pivoting body is subsequently moved into the second position, the female die cavities of the first pair of both body and stationary die, each female die portion containing a moulded part, are aligned with one another so that the two parts may be joined together to form a whole moulded article. At the same time, the female die cavity and male die core of the second pair in the body are aligned with the corresponding male die core and the female die cavity of the second pair in the stationary die to form first and second moulds for creating the two parts.

Thus, moulded in each angular position of the pivoting body, two moulded parts are being moulded on one side of the apparatus and two parts are being joined together to form a whole part on the other side of the apparatus. Consequently, a whole moulded article is produced in each position of the pivoting body, rather than only in the second position as with the first embodiment described above. Thus, the production range of the apparatus is doubled. Furthermore, a single piston and cylinder device delivering a set amount of molten material can be used.

Figure 10:
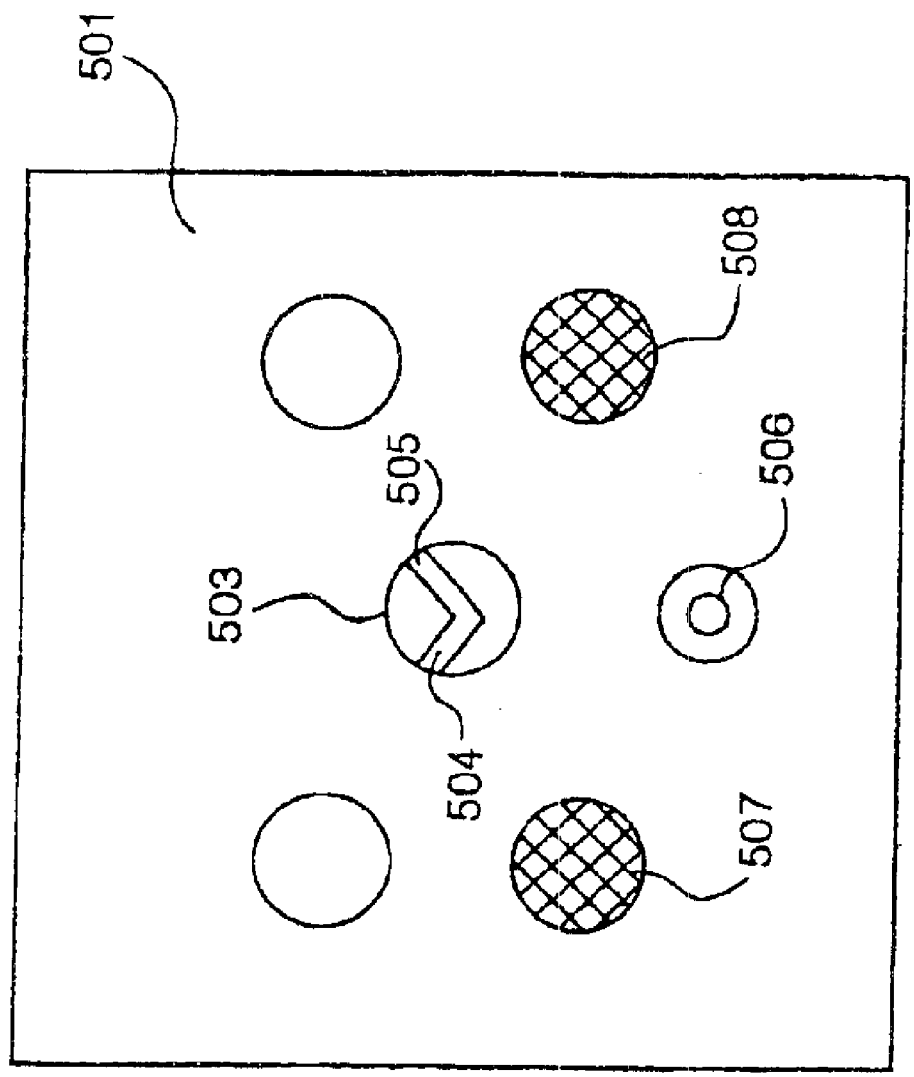
FIG. 10 shows one part of the apparatus of FIGS. 8 and 9.

A second embodiment of apparatus is illustrated in FIGS. 8, 9 and 10. As with the first embodiment this embodiment comprises a movable die 500 pivotally mounted on a backing plate (not shown) and a stationary die 501. The movable die is pivoted by a piston-and-cylinder arrangement 502. However, unlike the first embodiment, the apparatus will have two injection cylinders (not shown) each delivering a different material (e.g. two different coloured materials could be delivered). One material is delivered through a runner drop to a manifold 503 which has two outlets channels 504, 505. The other material is delivered to a runner drop 506. Two male die cores 507, 508 are provided on the stationary die 501.

In the operating condition shown in FIG. 8 a mould is defined between a female die cavity. 510 in the movable die 500 and the male die core 508 of the stationary die 501. A first material delivered through runner drop 506 flows along a runner 511 in the movable die 500 and enters the mould formed between female die cavity 510 and male die core 508. The material then solidifies and forms a first component. At the same time a previously moulded component composed of the first material is present in a female die cavity 512. Molten material of a second type is delivered via channel 504 in manifold 503 then via a runner 513 in the die 500 to the cavity 512 where it flows into a volume defined between the earlier moulded component and the cavity walls and then solidifies to form a second component of the moulded part which is subsequently ejected from the mould.

In the second operating condition shown in FIG. 9 the first material is delivered from runner drop 506 via runner 514 to a mould formed between female die cavity 512 and the male die core 507 and a first component is formed. At the same time second molten material is delivered via channel 505 in manifold 503 and via a runner 515 in the movable die 500 to the female die cavity 510 where it flows into a volume defined between the previously moulded component of the first material and the walls of the cavity 510 and then solidifies to complete the moulded part.

Hydraulic cylinders will move the movable die in a direction perpendicular to its rotational plane between operations to allow separation between the stationary die 501 and the movable die 500.

As will be clear to the skilled reader, the present invention provides an improved apparatus and method for forming hollow articles by an injection moulding process. The invention provides a relatively simple apparatus which requires a single injection device and a single hydraulic cylinder for rotating the body between two different positions in which different operations can be carried out. It will be apparent that a number of modifications and variations can be made to the apparatus and method described herein without departing from the scope of the invention.

What is claimed is:

1. A method of moulding an article comprising the steps of:
   (a) bringing together a first die with a second die in a first relative position to form first and second moulds, the first mould being defined between a single male die core of the second die and a single female die cavity of the first die and the second mould being defined between a single male die core of the first die and a single female die cavity of the second die;
   (b) using a single injection device to deliver a first amount of molten material which is relayed to both of the first and second moulds respectively via first and second runner drops defined in the first die, to form first and second moulded parts;
   (c) separating the first die from the second die to remove the male die cores from the female die cavities whilst retaining the first and second moulded part in the female die cavities;
   (d) moving the second die relative to the first die to a second relative position in which the female die cavity of the first die aligns with the female die cavity of the second die;
   (e) bringing together the first and second dies in the second relative position to bring together facing surfaces of the first moulded part situated in the female die cavity of the first die and the second moulded part situated in the female die cavity of the second die, the female die cavities of the first and second dies together defining a third mould in which both previously moulded parts are located;
   (f) using the single injection device to deliver a second amount of molten material to the third mould via the first runner drop, which molten material surrounds a part at least of each previously moulded part and then solidifies to connect and joint together the two previously moulded parts to form a single moulded entity;
   (g) removing the single moulded entity from the separated first and second dies; and
   (h) moving the first and second dies back to the first relative position and bringing the fist and second dies together to commence a further cycle and form a second moulded entity.

2. A method as claimed in claim 1 additionally comprising the steps of: delivering the molten material to the first and second moulds by first and second runners in the second die, the first and second runners aligning with the first and second runner drops in the first die to receive molten material therefrom only when the first and second dies are in the first relative position; and delivering the molten material to the third mould by a third runner in the second die, the third runner aligning with a first runner drop in the first die to receive molten material therefrom only when the first and second dies are in the second relative position.

3. A method as claimed in claim 1 further comprising the step of: moving the first and second dies from the first relative position to the second relative position and subsequently back from the second relative position to the first relative position by rotating the second die about an axis.

4. A method as claimed in claim 3 comprising the step of: using a single actuator to rotate the second die about the axis.

5. A method as claimed in claim 1 comprising the step of: using the same single injection device to deliver molten material of the same composition to the first and second moulds and to the third mould.

6. A method as claimed in claim 1, further comprising the step of using a part of the surface of the second die to seal off at least one of the runner drops in the surface of the first die whilst molten material is delivered to the third mold.

7. A method as claimed in claim 1, further comprising the step of heating the part of the surface of the second die used to seal off an aperture in the surface of first die.

8. A method as claimed in claim 1, further comprising the step of controlling the single injection device by using electronic control means to control the amount of molten material delivered by the single injection device such that the first amount of molten material delivered by the single injection device to the first and second moulds is different to the second amount of molten material delivered by the injection device to the third mould.

9. A method as claimed in claim 1, further comprising the step of injecting material or adding a further component between or into one or both of the moulded parts before injecting molten material to join the moulded parts together to form a whole article.

10. A method of moulding an article comprising the steps of:
    (a) bringing together first and second dies in a first relative position to form first and second moulds, the first mould being defined between a single male die core of the second die and a single female die cavity of the first die and the second mould being defined between a single male die core of the first die and a single female die cavity of the second die;
    (b) injecting molten material into both the first and second moulds, respectively via first and second runner drops defined in the first die to form first and second moulded parts;
    (c) separating the first and second dies to remove the male die cores from the female die cavities whilst retaining the first and second moulded pails in the female die cavities;
    (d) moving the first die relative to the second die to a second relative position;
    (e) bringing together the first and second dies in the second relative position to bring together facing surfaces of the first moulded part situated in the female die cavity of first die and the second moulded part situated in the female die cavity of the second die, the female die cavities of the first and second dies together defining a third mould in which both previously moulded parts are located;
    (f) injecting molten material into the third mould via the first runner drop, the molten material surrounding a part at least of each previously moulded part and solidifying to connect together the two previously moulded parts to form a single moulded entity;
    (g) separating the first and second dies and removing the single moulded entity from the separated first and second dies;
    (h) moving the first and second dies back to the first relative position and bringing the first and second dies together to commence a further cycle and form a second moulded entity; wherein the method comprises additionally the steps of: delivering the molten material to the first second and third moulds through a first and second runner drop which extend through the first die; delivering the molten material to the first and second moulds by first and second runners in the second die, the first and second runners aligning with first and second runner drops of the first die to receive molten material therefrom only when the first and second dies are in the first relative position; and delivering molten material to the third mould by a third runner in the second die, the third runner aligning with a runner drop of the first die to receive molten material therefrom only when the first and second dies are in the second relative position.

11. A method as claimed in claim 10 comprising the step of: moving the first and second dies from the first relative position to the second relative position and subsequently back form the second relative position to the first relative position by rotating the second die about an axis.

12. A method as claimed in claim 10 comprising the steps of: using a single runner drop to deliver molten material to one of the first and second runners and also to the third runner in the second die.

13. A method as claimed in claim 10 comprising the step of: using a part of the surface of the second die to seal off at least one of the runner drops in the surface of the first die whilst molten material is delivered to the third mould.

14. A method as claimed in claim 13 comprising the step of: heating the part of the surface of the second die used to seal off the aperture in the surface of the first die.

15. A method of moulding an article using apparatus which comprises: a first die; a second die; means to rotate the second die about an axis; means to move at least one of the first and second dies translationally parallel to the axis; and injection means for delivering molten material under pressure; the method comprising the steps of: a) bringing the first and second dies together in a first rotational position in which the first and second dies define between then a first mould; b) using the injection means to deliver a first amount of molten material; c) relaying the first amount of molten material to the first mould via a first runner provided in the second die; d) allowing the molten material to cool and solidify in the first mould to form a first component of the article; e) separating the first and second dies by moving at least one of the dies translationally; t) rotating the second die relative to the first die once separated therefrom; g) bringing the first and second dies together in a second rotational position in which the first and second dies define between them a second mould in which the previously formed component is located; h) using the injection means to deliver a second amount of molten material to the second mould; i) relaying the second amount of molten material to the second mould via a second runner provided in the second die; j) allowing the molten material to cool and solidify in the second mould to form a second component of the article surrounding the fist component.

16. A method as claimed in claim 15 where the first amount of molten material delivered by the injection means is different to the second amount of molten material delivered thereby.

17. A method as claimed in claim 15 wherein: the apparatus used comprises at least one runner drop extending through the first die which receives molten material delivered from the injection means; the first runner in the second die aligns with a runner drop in the first die only in the first rotational position of the second die; and the second runner in the second die aligns with a runner drop in the second die only in the second rotational position of the second die.

18. A method as claimed in claim 17 wherein the injection means comprises first and second injectors and wherein the first injector is used to deliver the first amount of a first molten material to the first mould and the second injector is used to deliver the second amount of second molten material to the second mould, the second molten material being different to the first molten material.

19. A method as claimed in claim 18 wherein: the first molten material is delivered through a first runner drop in the first die which aligns with the first runner in the second die in the first rotational position of the second die; and the second molten material is delivered through a second runner drop in the first die which aligns with the second runner in the second die in the second rotational position of the second die.

20. A method as claimed in claim 15 wherein: the injection means comprises a single injection; the first die comprises first and second runner drops; the first amount of molten material is delivered through the first runner drop which aligns with the first runner in the first rotational position of the second die; and the second amount of molten material is delivered through the second runner drop which aligns with the second runner in the second rotational position of the second die.

21. Apparatus for producing moulded articles, comprising: first and second dies, movable towards and away from one another in a direction parallel to an axis; the first and second dies each having a single female die cavity and a single male die core; means to rotate the second die about the axis; and a single injection device communicating with first and second runner drops defined in the first die; wherein, in a first angular position, the female die cavity in the first die receives the male die core of the second die to create a first mould, the female die cavity in the second die receives the male die core of the first die to create a second mould, and the first and second moulds are in communication with the first and second runner drops respectively to receive molten material from the injection device to create two moulded parts; and, in a second angular position, the female die cavities of the first and second dies are aligned with one another to create a third mould which communicates with the first runner drop to receive molten material from the injection device which surrounds and joins the moulded parts together to produce a whole moulded article.

22. Apparatus as claimed in claim 21, wherein the second die comprises a backing member and a body pivotally attached thereto for rotation about the axis relative to the backing member and the first die, the body defining the female die cavity and the male die core.

23. Apparatus as claimed in claim 22, wherein the body further includes a first runner associated with the male die core and second and third runners associated with the female die cavity of the body; wherein, in the first angular position, the first runner connects the first mould to the first runner drop in the first die and the second runner connects the second mould to the second runner drop in the first die, and, in the second angular position, the third runner connects the third mould to the first runner drop in the first die.

24. Apparatus as claimed in claim 22, wherein the body attached to the second die is sized so that in die second angular position the male die core of the first die is located beyond the marginal edge of the body and the male die core of the second die is located beyond the marginal edge of the first die.

25. Apparatus as claimed in claim 21, wherein, in the second angular position, the second runner in the first die is blanked off by a portion of the second die.

26. Apparatus as claimed in claim 25, wherein the blanking portion of the second die comprises a heated plate.

27. Apparatus as claimed in claim 21, wherein the first and second dies each have a recess for receiving the male die core of the other die in the second angular position.

28. Apparatus as claimed in claim 22, wherein the means to reciprocally rotate the body between the first and second angular positions comprises a piston pivotally secured to the body and a cylinder fixedly secured to the backing member.

29. Apparatus as claimed in claim 21, wherein the second die is movable towards and away from the first die along the axis under the action of a plurality of cylinders and cooperating pistons.

30. Apparatus as claimed in claim 21, further comprising a plurality of co-operating dowels and bores formed in the first and second dies to hold the dies in alignment in the first and second angular positions.

31. Apparatus as claimed in claim 21, wherein in the first angular position, the injection device is operable to inject a first quantity of molten material sufficient to fill the first and second moulds and, in the second angular position, the injection device is operable to inject a second, smaller quantity of molten material sufficient to join the moulded parts together.

32. Apparatus as claimed in claim 31, wherein the injection device comprises a screw-driven piston and cylinder.

33. Apparatus as claimed in claim 21, further comprising means to inject material or add a further component between or into one or both moulded parts before joining the moulded parts together to form a whole article.

34. A method of producing a moulded article using the apparatus of claim 23, comprising the steps of: with the first and second dies spaced from one another, rotating the second die to the first angular position; contacting the first and second dies whereby the female die cavity of the first die receives the male die core of the second die and the female die cavity of the second die receives the male die core of the first die to form the first and second moulds respectively; injecting molten material from the injection device through the first and second drops into the first and second moulds to form two moulded parts; separating the first and second dies; rotating the second die to the second angular position; contacting the first and second dies whereby the female die cavities, each containing a moulded part are aligned with one another to form a third mould; injecting molten material through the first runner drop to join the moulded parts together to create a whole moulded material; and separating the first and second dies to allow removal of the whole moulded article.

35. A method as claimed in claim 34, further comprising the step of injecting material or adding a further component between or into one or both of the moulded parts before injecting molten material to join the moulded parts together to form a whole article.

\* \* \* \* \*

UNITED STATES PATENT AND TRADEMARK OFFICE
CERTIFICATE OF CORRECTION

PATENT NO.    : 6,849,219 B2
DATED         : February 1, 2005
INVENTOR(S)   : David B. Rollins It is certified that error appears in the above-identified patent and that said Letters Patent is hereby corrected as shown below:

Column 9,
Line 60, replace "comprising" with -- further comprising --.

Column 10,
Line 34, replace "pails" with -- parts --.

Signed and Sealed this

Thirty-first Day of May, 2005

JON W. DUDAS
*Director of the United States Patent and Trademark Office*